Sept. 28, 1971  R. C. DAVIDSON  3,608,234
TOY AIRCRAFT VEHICLE
Filed Dec. 29, 1969  2 Sheets-Sheet 1
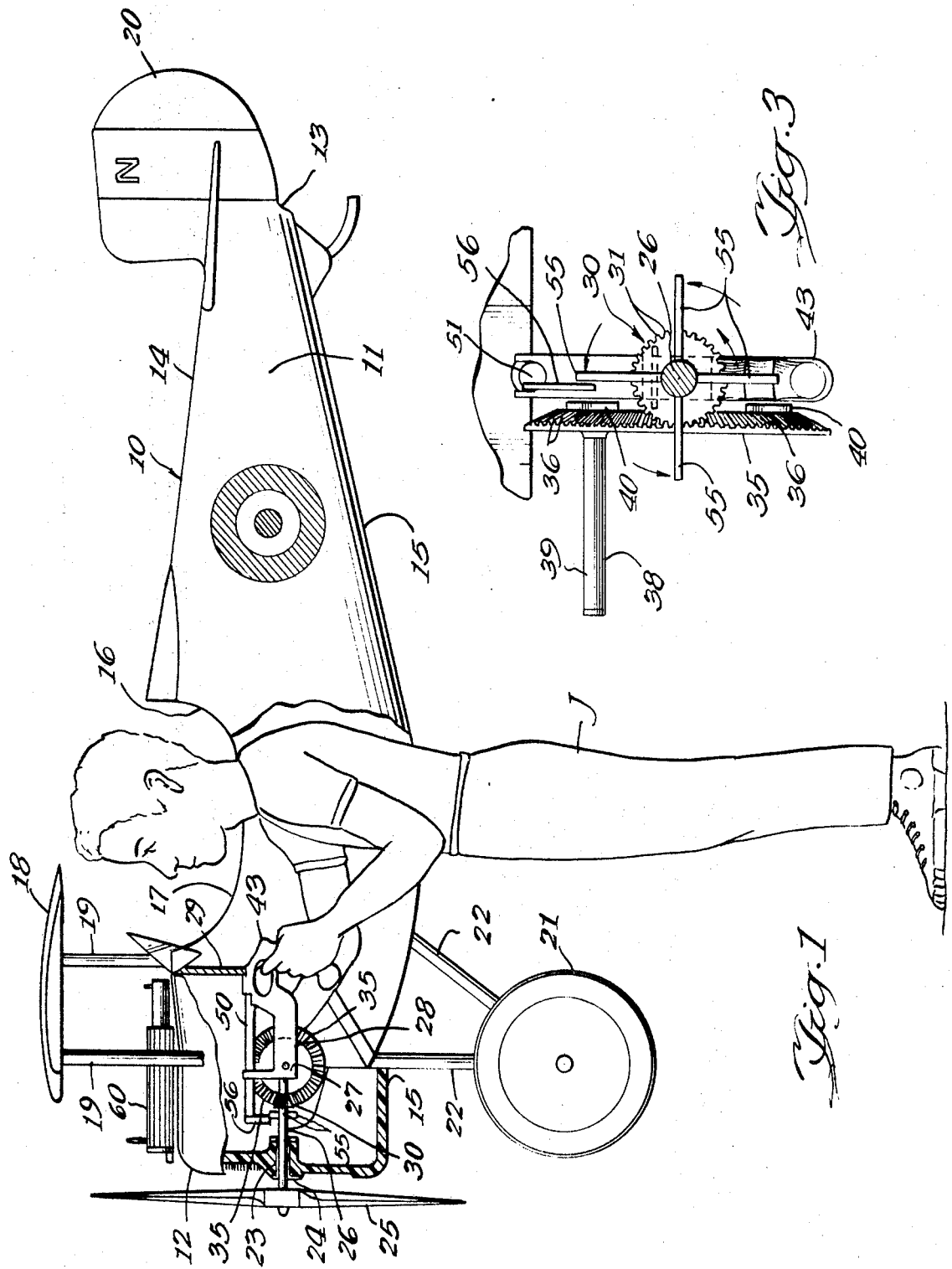
INVENTOR
Richard C. Davidson
BY Basil E. Demeur
ATTORNEY Sept. 28, 1971 — R. C. DAVIDSON — 3,608,234
TOY AIRCRAFT VEHICLE
Filed Dec. 29, 1969 — 2 Sheets-Sheet 2
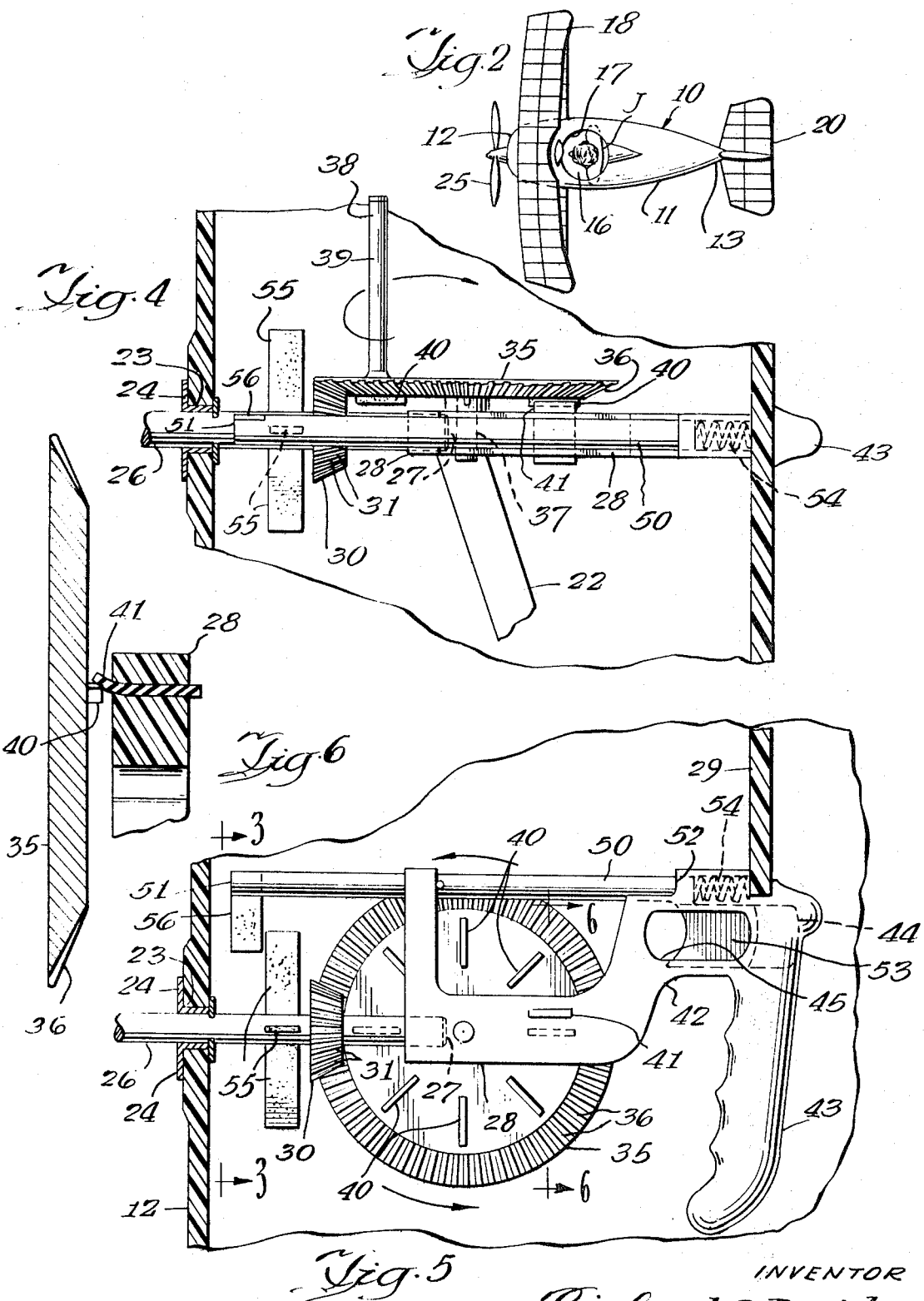
INVENTOR
Richard C. Davidson
BY Basil E. Demser
ATTORNEY

United States Patent Office 3,608,234
Patented Sept. 28, 1971

3,608,234
TOY AIRCRAFT VEHICLE
Richard C. Davidson, 6241 S. Paulina Ave.,
Chicago, Ill. 60636
Filed Dec. 29, 1969, Ser. No. 888,680
Int. Cl. A63h *1/32*
U.S. Cl. 46—47                                      4 Claims

ABSTRACT OF THE DISCLOSURE

A juvenile toy aircraft for simulating aircraft flying for juvenile operators having a light-weight fuselage body shell including an open lower end, a cut-out portion in the upper surface of the body shell, the undersurface of the cut-out portion adapted for seatment upon the shoulders of the juvenile operator along opposed lateral edges thereof, wing structure mounted on the upper surface of the body shell, tail structure mounted on the body shell adjacent the rear end thereof, a propeller, first hand-actuated means associated with the propeller for impelling the propeller, a simulated gun structure mounted on the body shell, and second hand-actuated means for providing simulated gun sounds whereby the juvenile operator may mount the toy aircraft vehicle on his shoulders to simulate aircraft flying.

DESCRIPTION OF INVENTION

This invention is directed to a novel toy aircraft vehicle for juvenile operators which provides a toy for simulating aircraft flying while at the same time providing an exercise device for juveniles. More specifically, this invention is directed to a novel toy aircraft vehicle which includes a body shell fuselage portion, wing structure, tail structure, propeller and simulated gun structure whereby a juvenile operator may mount the toy aircraft vehicle on his body and simulate aircraft flying.

It is therefore one object of this invention to provide a novel toy aircraft vehicle for simulating aircraft flying for juvenile operators which includes a light-weight fuselage body shell having forward and rear ends, an upper surface and being open along the lower end, the upper surface having a cut-out portion adjacent the forward end of the body shell and in vertical alignment with at least a portion of the open lower end, the cut-out portion simulating an aircraft cockpit, the undersurface of the cut-out portion being adapted for seatment upon the shoulders of the juvenile operator along opposed lateral edges thereof, wing structure mounted on the upper surface of the body shell adjacent the cutout portion, and tail structure mounted on the body shell adjacent the rear end thereof whereby the toy aircraft vehicle may be mounted on the shoulders of the juvenile operator and aircraft flying thereby simulated.

Another object of this invention is to provide a toy aircraft vehicle of the type described above which further includes a propeller mounted on the forward end of the body shell and first hand-actuated means associated with the propeller for impelling the propeller while the toy aircraft vehicle is suspended from the shoulders of the juvenile operator.

Still another object of this invention is to provide a toy aircraft vehicle of the type described which further includes a simulated gun structure mounted on the upper surface of the body shell adjacent the cut-out portion and second hand-actuated means associated with the simulated gun structure for providing sounds to simulate gun sounds while the toy aircraft vehicle is suspended from the shoulders of the juvenile operator thereof.

Yet a further object of this invention is to provide a novel toy aircraft vehicle for simulating aircraft flying for juvenile operators which includes a light-weight body shell having forward and rear ends, and an upper surface and being open along the lower end, the upper surface having a cut-out portion adjacent the forward end of the body shell and in vertical alignment with at least a portion of the open lower end, the cut-out portion simulating an aircraft cockpit, the undersurface of the cut-out portion being adapted for seatment upon the shoulders of the juvenile operator thereof along opposed lateral edges thereof, wing structure mounted on the upper surface of the body shell adjacent the cut-out portion, tail structure mounted on the body shell adjacent the rear end thereof, a pair of wheels mounted on the lower side of the body shell and extending vertically downwardly therefrom, a propeller mounted on the forward end of the body shell, first hand-actuated means associated with the propeller for impelling the propeller, a simulated gun structure mounted on the upper surface of the body shell adjacent the cut-out portion, and second hand-actuated means associated with the simulated gun structure for providing sounds to simulate gun sounds, whereby the toy aircraft vehicle may be disposed upon the shoulders of the juvenile operator by insertion of his body through the open lower end and through the cut-out portion in the upper surface to position the undersurface of the cut-out portion upon the shoulders of the juvenile operator along opposed lateral edges thereof, and the juvenile operator may grasp and operate the first hand-actuated means with one hand to impel the propeller and the juvenile operator may grasp and operate the second hand-actuated means with the other hand to provide simulated gun sounds, thereby to provide a toy aircraft vehicle for simulating aircraft flying for juvenile operators.

Another object of this invention is to provide a novel toy aircraft vehicle for juvenile operators which is simple in construction and light-weight thereby to facilitate manipulation thereof by the juvenile operator.

Still a further object of this invention is to provide a novel toy aircraft vehicle for juvenile operators which provides ease of operation while yet providing an exercise vehicle for juvenile operators.

Further features of the invention pertain to the particular arrangement of the elements and parts whereby the above-outlined and additional operating features thereof are attained.

The invention both as to its organization and method of operation, together with further objects and advantages thereof, will best be understood by reference to the following specification taken in connection with the accompanying drawings in which:

FIG. 1 is a partially cutaway, side elevational view;

FIG. 2 is a top plan view;

FIG. 3 is a front cross-sectional view taken in the direction of the arrows along the line 3—3 in FIG. .5;

FIG. 4 is a top cross-sectional view illustrating the first hand-actuated means for impelling the propeller;

FIG. 5 is a side cross-sectional view illustrating the first hand-actuated means for impelling and the second hand-actuated means for providing simulating gun sounds; and FIG. 6 is a side cross-sectional view more clearly illustrating the noise mechanism for the propeller.

Referring now to FIGS. 1 and 2, there is shown a toy aircraft vehicle, generally designated by the numeral 10, in the use position as carried on the shoulders of the juvenile operator J. The aircraft vehicle 10 includes a body shell fuselage 11 having a forward end 12, a rear end 13, an upper surface 14 and a lower end 15. The upper surface 14 of the body shell 11 includes a cut-out portion 16 having an undersurface 17 as can be more clearly observed in FIG. 2. The body shell 11 is further provided with a wing structure 18 mounted thereon by means of a pair of wing mounts 19, the wing 18 being between the forward end 12 of the body shell 11 and the cut-out portion 16. The rear end 13 of the body shell 11 carries a tail structure 20 mounted thereon, while the lower end 15 of the body shell 11 carries a pair of wheels 21 mounted thereon by means of wheel supports 22.

The forward end 12 of the body shell 11 is provided with an opening 23 in which a collar 24 is press-fitted. A propeller 25 is provided having a shaft 26 centrally mounted on the propeller 25 and extending laterally inwardly into the body shell 11 through the collar 24 disposed in the opening 23, and terminating at an inner end 27 thereof. A shaft mount 28 is provided within the inner confines of the body shell 11 and held in place there by a support bar 29 which is integral with the shaft mount 28. The shaft mount 28 is slotted in order to receive and hold the inner end 27 of the shaft 26, as more clearly shown in FIG. 5.

Referring now more particularly to FIGS. 3, 4 and 5, the shaft 26 carries a first circular gear 30 provided with a plurality of teeth 31 (FIG. 5), the first gear 30 being fixedly mounted on the shaft 26 intermediate the opening 23 and the shaft mount 28, whereby the shaft 26 is rotationally responsive to the rotational movement of the first gear 30. A second circular gear 35 is provided having a plurality of teeth 36 circumferentially disposed in the inner surface of the second gear 35. The second gear 35 includes a mounting pin 37 centrally disposed therein at its one end and rotatably mounted on the shaft mount 28 at its other end whereby the second gear 35 is carried by the shaft mount 28. The first gear 30 and the second gear 35 are so arranged and mounted that the teeth 31 of the first gear 30 and the teeth 36 of the second gear 35 are in meshed relation. The outer surface of the second gear 35 is further provided with a handle 38 having a sleeve 39 rotatably disposed thereon. The inner surface of the second gear 35 is also provided with a plurality of elongated nibs 40 fixedly mounted thereon and disposed inwardly with respect to the teeth 36 of the second gear 35. The shaft mount 28 is provided with a strike flange 41 mounted thereon and extending outwardly therefrom a short distance in the direction of the inner surface of the second gear 35, the strike flange 41 being so arranged as to contact the nibs 40 as the second gear 35 is rotated.

The shaft mount 28 includes a neck portion 42 which terminates in a grip handle 43 at the outer end of the shaft mount 28. The upper portion of the grip handle 43 is hollowed, as indicated by the phantom line 44 in FIG. 5, and includes a slotted section 45. A carriage shaft 50 is provided having an outer end 51 and an inner end 52. The inner end 52 of the carriage shaft 50 terminates in a trigger 53 which depends from the inner end 52 and is fitted within the hollow slotted section 45 of the grip handle 43. A spring 54 is provided biased between the inner end 52 of the carriage shaft 50 and the support bar 29. The shaft 26 is provided with a series of flexible flanges 55 which are fixedly mounted thereon whereby the flexible flanges 55 are rotationally responsive to the rotational movement of the shaft 26, while the outer end 51 of the carriage shaft 50 includes a depending flange 56 mounted thereon and extending downwardly therefrom. In the normal rest position of the carriage shaft 50, the depending flange 56 rests adjacent to the flexible flanges 55 and out of contact therewith. A gun structure 60 is mounted on the upper surface 14 of the body shell 11 which is associated generally with carriage shaft 50 structure described hereinabove.

In operation, the juvenile operator J lifts the toy aircraft vehicle 10 up over his body whereby his body is inserted through the open lower end 15 of the body shell 11 and through the cut-out portion 16 in the upper surface 14 thereof, resting the undersurface 17 of the cut-out portion 16 on his shoulders. In this position, the cut-out portion 16 simulates an aircraft cockpit and by manipulating and twisting his body, the juvenile operator J may easily simulate aircraft flying.

In order to operate the propeller 25 while the toy aircraft 10 is disposed on his shoulders, the juvenile operator J grasps the sleeve 39 of the handle 38 and commences to rotate the handle 38 in a circular path, the sleeve 39 permitting such circular movement of the handle 38. This rotational movement imparts rotational movement to the second gear 35 about pin 37, and since the teeth 36 of the second gear 35 are in meshed relation with the teeth 31 of the first gear 30, rotational movement is thereby imparted to the first gear 30 and thereby to the shaft 26 to which the first gear 30 is fixedly mounted. Rotational movement of the shaft 26 thereby results in the rotational movement of the propeller 25. Furthermore, as the second gear 35 is caused to rotate, the elongated nibs 40 are each caused to contact the flange 41 mounted on the shaft mount 28 thereby causing a repetitive sound to simulate the propeller or engine sound of an actual aircraft. Clearly, the sound to be achieved is dependent upon the number of nibs 40 provided in the second gear 35.

The simulation of sound for the gun structure is accomplished in association with the rotation of the shaft 26 through rotation of the second gear 35. As the shaft 26 is rotating, the juvenile operator J may grasp the grip handle 43 with his other hand and insert one finger through the slotted section 45 in order to grip the trigger 53. Since the trigger 53 is integral with the carriage shaft 50, as the trigger 53 is pulled rearwardly, the outer end 51 of the carriage shaft 50 is caused to move rearwardly thereby bringing the depending flange 56 into contact with each of the flexible flanges 55 as they rotate in response to the rotational movement of the shaft 26. In this manner a repetitive clicking sound is created to simulate a gun sound. Due to the presence of the spring 54, the rearward movement of the trigger 53 causes the inner end 52 of the carriage shaft 50 to compress the spring 54 such that when the pressure is released from the trigger 53, the spring 54 will force the carriage shaft 50 forward thereby in turn forcing the depending flange 56 out of contact with the flexible flanges 55.

Various modifications may be effected without departing from the spirit and scope of this disclosure. For example, in lieu of resting the undersurface 17 of the cut-out portion 16 on the shoulders of the juvenile operator J, a pair of shoulder straps may be provided suitably fastened to the inside surface of the body shell 11, whereby the straps could provide the shoulder support. Also, the various nib 40—flange 41, or flexible flange 55—depending flange 56 combinations could be reversed whereby the flexible member could be reversed with the corresponding rigid member. Various other modifications and alterations are similarly apparent.

With respect to the materials from which the various components of the toy aircraft vehicle could be formulated, it is of course necessary that the materials be light-weight in view of the weight limits imposed since this toy is intended for small juveniles. In addition, it is preferable to use materials which minimize the danger of injury to the juvenile. Hence, representative materials would include plastics, cardboard, foam plastics such as polyurethane foam or polystyrene foam, and the like, the preferred material being a foam plastic such as polystyrene foam. The movable parts should preferably be formed of a durable hard but light-weight plastic in order to perform in the manner described herein. It is therefore clear that the precise types of materials used is immaterial except that such materials be light-weight whereby the complete toy would weigh preferably no more than about fifteen pounds, although the weight factor will depend upon the age group of the juveniles which are intended to operate the aircraft vehicle.

Finally, it is also contemplated that the toy aircraft vehicle as described herein could be formed and initially sold in kit form whereby the consumer would assemble the parts pursuant to a schematic. In order to accomplish this function, suitable holes, notches, flanges and the like could be provided in the various parts in order to facilitate assembly.

In summary, a novel toy aircraft vehicle for simulating aircraft flying for juvenile operators which is light-weight and easily manipulative. While there has been described what is at present considered to be the preferred embodiment of the invention, it will be understood that various modifications may be made therein, and it is intended to cover in the appended claims all such modifications as fall within the true spirit and scope of the invention.

What I claim is:

1. A juvenile toy aircraft vehicle for simulating aircraft flying for juvenile operators comprising a lightweight fuselage body shell having forward and rear ends, an upper surface and being open along the lower end, said upper surface having a cut-out portion adjacent the forward end of said body shell and in vertical alignment with at least a portion of said open lower end, said cut-out portion simulating an aircraft cockpit, the under surface of said cut-out portion being adapted for seatment upon the shoulders of the juvenile operator thereof along opposed lateral edges thereof, such that the body of the juvenile operator is accommodated through said open lower end and said cut-out portion whereby the vehicle may be carried out on the shoulders of the juvenile operator thereof, wing structure mounted on the upper surface of said body shell adjacent said cut-out portion, tail structure mounted on said body shell adjacent the rear end thereof, a propeller mounted on the forward end of said body shell, and first hand-actuated means associated with said propeller for impelling said propeller, a simulated gun structure mounted on the upper surface of said body shell adjacent said cut-out portion and second hand-actuated means associated with said simulated gun structure for providing sounds to simulate gun sounds, and a pair of wheels mounted on the lower side of said body shell and extending vertically downwardly therefrom, whereby the toy aircraft vehicle may be disposed upon the shoulders of the juvenile operator by insertion of his body through said open lower end and through said cut-out portion in said upper surface to position the under surface of said cut-out portion upon the shoulders of the juvenile operator thereof along opposed lateral edges thereof permitting the juvenile operator to simulate aircraft flying by having the toy aircraft vehicle suspended in air while the operator's body is positioned in the simulated cockpit, and further permitting the juvenile operator to operate said first hand-actuated means while the toy aircraft vehicle is suspended from his shoulders thereby to impel and rotate said propeller, and to operate said second hand-actuated means while the toy aircraft vehicle is suspended from his shoulders thereby to simulate gun sounds.

2. The toy aircraft vehicle as set forth in claim 1 wherein said first hand-actuated means includes a shaft centrally mounted on said propeller and extending laterally inwardly therefrom through said body shell, a shaft mount connected to said body shell adapted for receiving and holding the inner end of said shaft, a first toothed circular gear fixedly mounted on said shaft, a second toothed circular gear having a mounting pin centrally disposed thereon for mounting said second gear on said shaft mount, said teeth of said second gear being in meshed relation with said teeth of said first gear whereby said first gear is rotationally responsive to the rotational movement of said second gear, and a handle mounted on the outer surface of said second gear whereby the juvenile operator may grasp said handle with one hand to rotate same thereby to rotate said second gear whereby said first gear is caused to rotate resulting in the rotational movement of said propeller.

3. The toy aircraft vehicle as set forth in claim 2 which further includes a strike flange fixedly mounted on said shaft mount and extending laterally outwardly therefrom a short distance, and a plurality of elongated nibs mounted on the inner surface of said second gear whereby the rotational movement of said second gear causes said elongated nibs to contact said flange thereby to create and simulate a propeller sound.

4. The toy aircraft vehicles as set forth in claim 2 wherein said second hand-actuated means includes a series of flexible flanges fixedly mounted on said shaft adjacent said first gear and extending outwardly therefrom, a carriage shaft disposed adjacent said shaft mount and having an outer end and an inner end, said outer end having a depending flange mounted thereon and said inner end terminating in a finger grip portion, and a spring biased between said inner end of said carriage shaft and said shaft mount, whereby the juvenile operator may grasp said finger grip and compress said spring thereby to bring said depending flange into contact with said flexible flanges while said shaft is rotated to create and simulate a gun sound.

References Cited

UNITED STATES PATENTS 2,258,531  10/1941  Baldwin  46—1
2,864,613  12/1958  Porter  46—1

LOUIS G. MANCENE, Primary Examiner

D. L. WEINHOLD, Jr., Assistant Examiner

U.S. Cl. X.R.

46—1B, 1H